US011865727B1

(12) United States Patent
Parness et al.

(10) Patent No.: US 11,865,727 B1
(45) Date of Patent: Jan. 9, 2024

(54) ROBOTIC PICKING ASSEMBLIES WITH DIFFERENT CONCURRENT FLOW RATES

(71) Applicant: Amazon Technologies, Inc., Seattle, WA (US)

(72) Inventors: Aaron Joseph Parness, Mercer Island, WA (US); Benjamin Bedard, Seattle, WA (US); Emily Dunne, Seattle, WA (US); Felipe De Arruda Camargo Polido, North Reading, MA (US)

(73) Assignee: Amazon Technologies, Inc., Seattle, WA (US)

( * ) Notice: Subject to any disclaimer, the term of this patent is extended or adjusted under 35 U.S.C. 154(b) by 421 days.

(21) Appl. No.: 17/101,720

(22) Filed: Nov. 23, 2020

(51) Int. Cl.
*B25J 9/16* (2006.01)
*B25J 15/06* (2006.01)

(52) U.S. Cl.
CPC .......... *B25J 9/1687* (2013.01); *B25J 9/1669* (2013.01); *B25J 15/0633* (2013.01); *B25J 15/0683* (2013.01)

(58) Field of Classification Search
CPC .... B25J 9/1687; B25J 9/1669; B25J 15/0633; B25J 15/0683; B25J 15/0616; B65G 47/91; B01D 46/2403
See application file for complete search history.

(56) References Cited

U.S. PATENT DOCUMENTS

| | | | | |
|---|---|---|---|---|
| 10,576,630 B1 * | 3/2020 | Diankov | ................ | B25J 9/1633 |
| 10,639,790 B1 * | 5/2020 | Bacon | .................. | B07C 5/3404 |
| 2016/0096278 A1 * | 4/2016 | Cho | ..................... | B25J 15/0616 |
| | | | | 294/185 |
| 2017/0120455 A1 * | 5/2017 | Wagner | ................ | B25J 15/0616 |
| 2017/0265392 A1 * | 9/2017 | Van De Vegte | ..... | B25J 11/0045 |
| 2019/0344448 A1 * | 11/2019 | Wicks | .................. | B25J 15/0004 |
| 2020/0048015 A1 * | 2/2020 | Martin | ................... | B65G 47/91 |
| 2020/0262087 A1 * | 8/2020 | Douglas | ............... | B25J 15/0057 |

* cited by examiner

*Primary Examiner* — Nicholas Kiswanto
*Assistant Examiner* — Madison B Emmett
(74) *Attorney, Agent, or Firm* — Eversheds Sutherland (US) LLP

(57) ABSTRACT

Systems, methods, and computer-readable media are disclosed for robotic picking assemblies with different concurrent flow rates. In one embodiment, an example system may include a picking assembly coupled to a vacuum system. The picking assembly may include a first suction cup assembly having a first flow rate, the first suction cup assembly including a first suction cup and a first mesh filter disposed in the first suction cup, a second suction cup assembly having a second flow rate, the second suction cup assembly including a second suction cup and a second mesh filter disposed in the second suction cup, and a third suction cup assembly having the second flow rate, the third suction cup assembly including a third suction cup and a third mesh filter disposed in the third suction cup. The picking assembly may grasp items based on the first flow rate and the second flow rate.

20 Claims, 8 Drawing Sheets

ROBOTIC PICKING ASSEMBLIES WITH DIFFERENT CONCURRENT FLOW RATES

BACKGROUND

As users increasingly make online purchases, fulfilment of such purchases and other orders may become increasingly complicated. For example, a fulfillment center may have output of upwards of one million packages per day. With such demands, efficiency of logistics related to processing orders and packages may be important. Accordingly, improvements in various operations of order fulfillment, such as improvements to picking technology, sorting technology, packing technology, and so forth may be desired, such that manual efforts can be redirected to different tasks.

Figure 1:
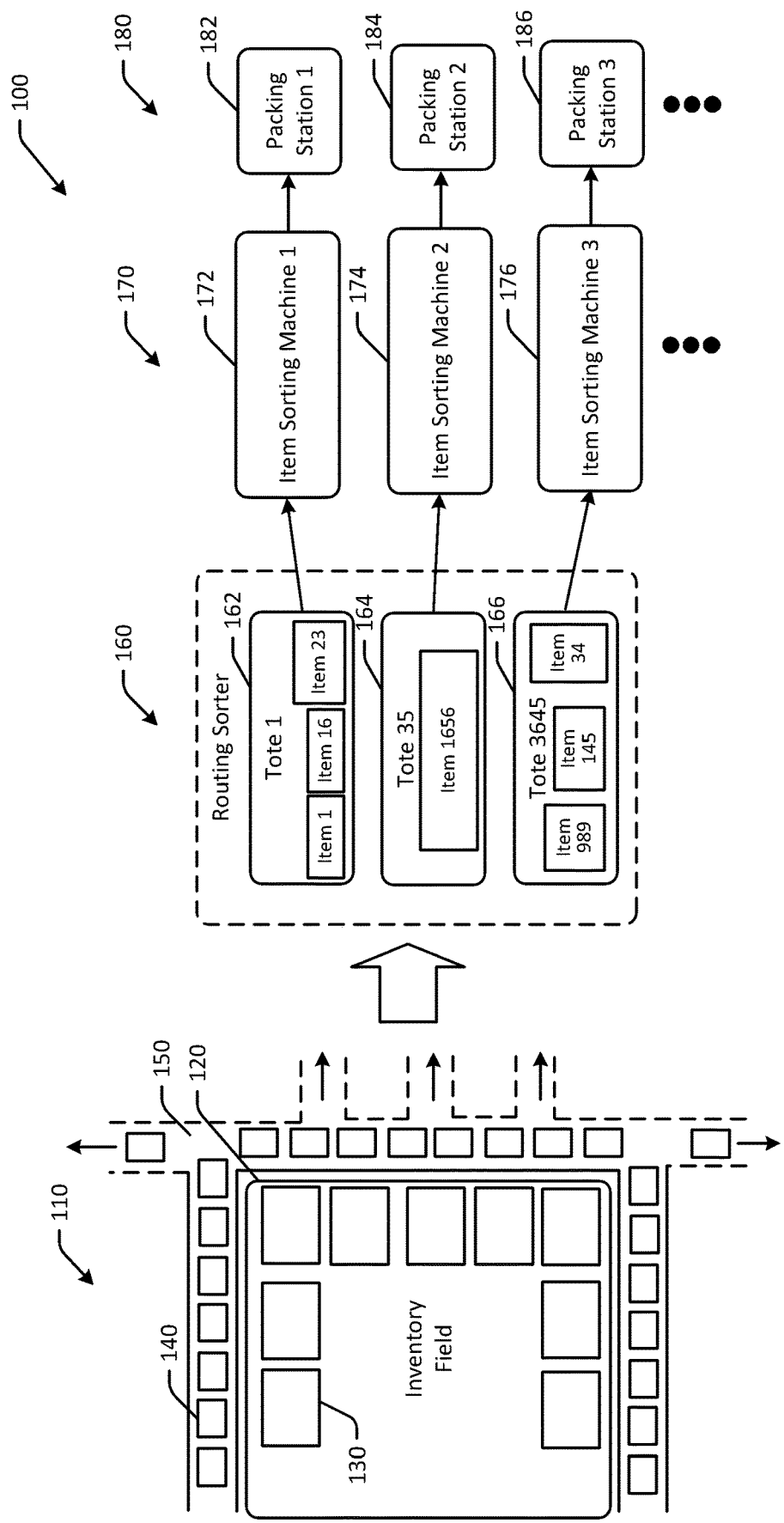
FIG. 1 is a hybrid schematic illustration of an example use case for robotic picking assemblies with different concurrent flow rates and an example process flow in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Fulfillment centers may be used to fulfill online purchases and other orders. For example, fulfillment centers may include product inventory that may be pulled when an order for a particular product or multiple products is placed. In some instances, the product(s) may be packed and shipped from the fulfillment center. However, the process of obtaining the product(s), packing the product(s), and shipping the product(s) may be complicated due to the amount of inventory, the number of orders to process, the size of the fulfillment center, and/or other factors. In addition, a portion of the fulfillment center designated for packing or shipping may be different than the portion of the fulfillment center designated for holding product inventory. As a result, transportation of products in an order may be time consuming.

Moving items or objects through a fulfillment center may require handling of the item itself. For example, picking the item from inventory, placing the item into a container, removing the item from a container, and so forth may all be examples of actions for which an item may need to be handled. In addition, different items may have different types of packaging. For example, some items may come in boxes, some items may come in loose bags, some items may come shrink wrapped, some items may not have any packaging, and so forth. In addition, retrieving a certain number of items, such as singular items, or multiple items in cluttered environments (e.g., stacked on top of each other or otherwise in a number of layers, etc.), may be difficult, and may depend on a type of packaging in which the item comes with. Humans may be able to manually handle individual items with ease. However, robotic handling of items may require various levels of dexterity. In addition, using a robot or other machine to grasp an item in a cluttered environment, such as a box or tote with multiple items inside, may be difficult to achieve reliably using mechanical systems.

Embodiments of the disclosure include methods and systems for using picking assemblies with asymmetrical suction cup flow rates to accurately grasp and move items regardless of packaging, thereby improving processing and fulfillment of orders, or other object aggregation tasks. Certain embodiments include robotic arms with picking assemblies having suction cup assemblies with different flow rates. Based at least in part on the type of item to be grasped and/or its packaging, a suction cup with a specific flow rate may be selected to grasp the object. Certain embodiments may identify items and/or determine item characteristics using computer vision. Some embodiments include optimized process flows for processing of orders at fulfillment centers, as well as process flows or methods to increase speed of consolidating products in a multi-item order as a result of improved speed in placing items into containers and removing items from containers. As a result, throughput of fulfillment centers may be improved, and/or logistics of fulfillment center operations may be less complicated.

Referring to FIG. 1, an example use case 100 for robotic picking assemblies with different concurrent flow rates and an example process flow in accordance with one or more embodiments of the disclosure. Although discussed in the context of online orders, other embodiments may be directed to any suitable use case where objects are picked and released, such as instances where objects are picked from inventory, placed into containers, removed from containers for sorting, and so forth.

In FIG. 1, a fulfillment center may include an inventory field 110, a routing sorter 160, one or more item sorting machines 170, and one or more packing stations 180. The inventory field 110 may be include a storage platform, or a portion of the fulfillment center at which products picked from product inventory are placed. Robots may be used to pick products from inventory and to deliver to the robotic storage platform in some instances, while in other instances, manual labor or a combination thereof may be used to pick products. For example, robotic picking assemblies with different concurrent flow rates may be used to pick objects from inventory containers and to place the retrieved objects into containers. The picking process at the robotic storage platform may include locating a product in an order, obtaining the product, and sending the product to a robotic storage platform, such as via a conveyor belt. In the illustrated embodiment, products at the robotic storage platform may be placed in a container, such as a tote.

The inventory field 110 may include multiple items that are in inventory. The items may be used to fulfill orders. The inventory field 110 may be a robotic field in some instances. One or more picking stations 130 may be positioned along a perimeter 120 of the inventory field 110. The picking stations 130 may be manually operated or may include robotic components, or a combination thereof. In some instances, picking of items from the inventory field 110 may be completed by robots that include robotic picking assemblies with different concurrent flow rates, where the items are delivered to the picking stations 130 after being retrieved from the inventory field 110. Any number of picking stations 130 may be included, and the picking stations 130 may be located in a different position than that illustrated in FIG. 1.

One or more conveyors 150 may be disposed about the inventory field 110. For example, conveyors 150 may be disposed along the perimeter 120 of the inventory field 110. The conveyors 150 may run adjacent to the picking stations 130 in some embodiments. Any suitable conveyor configuration may be used. In the illustrated example, the conveyors 150 may include belts or rollers that run alongside the picking stations 130 and include one or more paths to one or more routing sorters.

The conveyors 150 may be used to transport one or more totes 140. For example, as totes 140 move along the conveyors 150, items may be moved from the picking stations 130 into respective totes 140. The totes 140 may be associated with particular item sorting machines, and may be moved using the conveyors 150 to a routing sorter 160.

The routing sorter 160 may be configured to route, divert, or otherwise guide certain totes to an item sorting machine. The routing sorter 160 may include any combination of ramps, slides, rollers, arms, guides, and/or other components to route totes to a particular item sorting machine. At the routing sorter 160, totes including products that have been picked may be routed to the appropriate or designated item sorting machine. For example, the routing sorter 160 may determine an identifier associated with the tote, and may determine an item sorting machine associated with the tote using the identifier. The routing sorter 160 may route or direct the tote to the appropriate item sorting machine.

A number of item sorting machines 170 may be coupled to the routing sorter 160. For example, a first item sorting machine 172, a second item sorting machine 174, a third item sorting machine 176, and so forth may be coupled to the routing sorter 160. The routing sorter 160 may guide totes to the item sorting machines to which they are assigned. For example, a first tote 162 may include item 1, item 16, and item 23, and may be assigned to the first item sorting machine 172. The routing sorter 160 may therefore route the first tote 162 to the first item sorting machine 172 for sortation of the respective items. A second tote 164 may include item 1656, and may be assigned to the second item sorting machine 174. The routing sorter 160 may therefore route the second tote 164 to the second item sorting machine 174 for sortation of the item. A third tote 166 may include item 989, item 145, and item 34, and may be assigned to the third item sorting machine 176. The routing sorter 160 may therefore route the third tote 166 to the third item sorting machine 176 for sortation of the respective items.

Some or all of the item sorting machines may be associated with one or more packing stations 180 that may be used to pack items into a shipment when a single-item or multi-item order is complete. For example, the first item sorting machine 172 may be coupled to a first packing station 182, the second item sorting machine 174 may be coupled to a second packing station 184, the third item sorting machine 176 may be coupled to a third packing station 186, and so forth. The item sorting machines may be configured to receive items from totes that have one or more, or multiple, items. The number of totes and/or the number of items associated with respective item sorting machines may be balanced, and multiple totes may be routed to the first item sorting machine 172 and the second item sorting machine 174 at the same time.

At any of the stages of the example fulfillment process of FIG. 1 where handling of objects is used, such as to pick items from inventory, place items in totes, remove items from totes, place items into bins, remove items from bins, place items into boxes for shipping, and so forth, robotic picking assemblies with different concurrent flow rates as described herein may be used. As a result, manual effort can be redirected to other tasks.

Embodiments of the disclosure include robotic picking assemblies with different concurrent flow rates. Certain embodiments may improve processing speed and/or throughput of fulfillment centers. Certain embodiments may improve performance of mechanical equipment for sortation and/or consolidation of items. While described in the context of online orders, aspects of this disclosure are more broadly applicable to other forms of object handling.

Unlike other suction-based grippers, the robotic picking assemblies with different concurrent flow rates described herein may accurately grasp items in loose packaging, and may provide control over individual release of items that have been grasped, with repeatable performance Certain embodiments may be configured to automatically identify items that have been grasped, and to determine an order of release of the items.

Example embodiments of the disclosure provide a number of technical features or technical effects. For example, in accordance with example embodiments of the disclosure, certain embodiments of the disclosure may improve processing speed, throughput, and/or efficiency of fulfillment centers. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

Illustrative Embodiments and Use Cases

Figure 2:
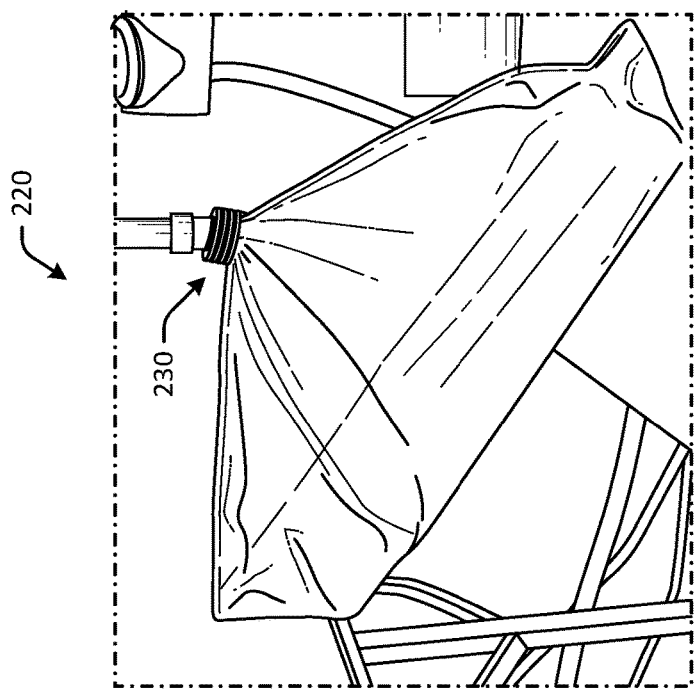
FIG. 2 is a schematic illustration of an example robotic picking assembly and an example use case for grasping an item with loose packaging in accordance with one or more embodiments of the disclosure.
Figure 2:
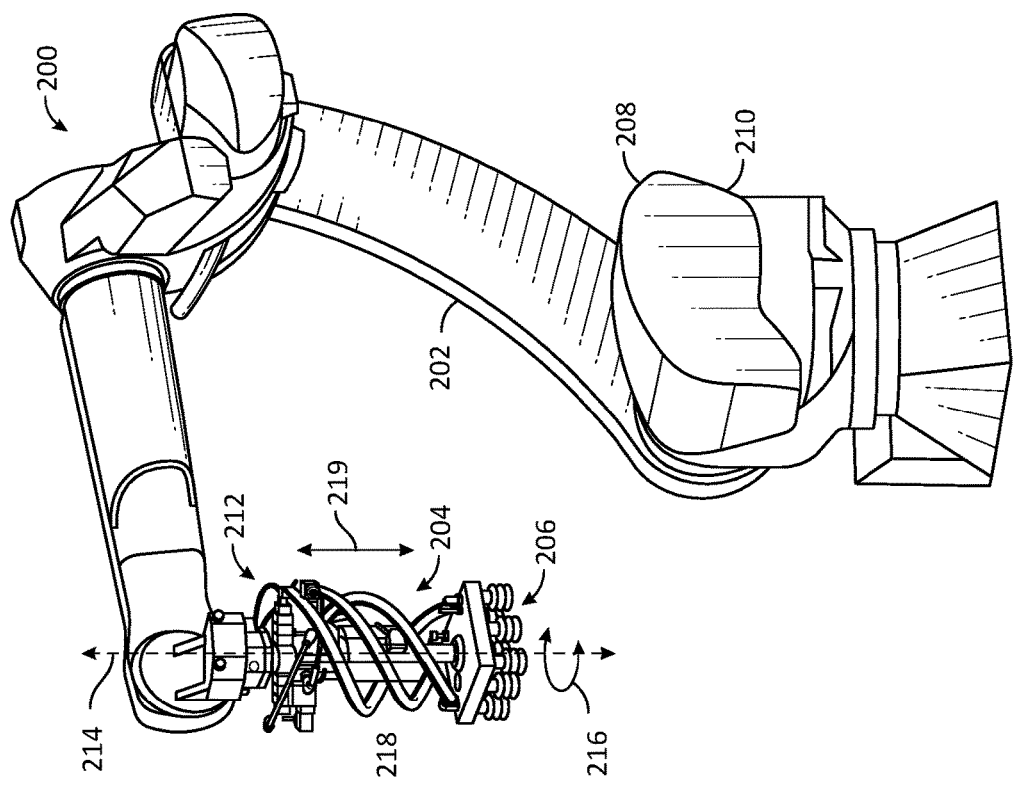

FIG. 2 is a schematic illustration of example robotic picking assembly 200 and an example use case 220 for grasping an item with loose packaging in accordance with one or more embodiments of the disclosure. Other embodiments may include additional or fewer components. The illustration of FIG. 2 may not be to scale, and may not be illustrated to scale with respect to other figures. The robotic picking assembly illustrated in FIG. 2 may be the same picking assembly discussed with respect to FIG. 1.

The robotic picking assembly 200 may be an item manipulation system including a robotic manipulator 202 and a picking assembly or end of arm tool 204 having a suction manifold 206 including asymmetrical independently controllable suction zones, according to at least one example. The robotic picking assembly 200 also includes a management device 208 and a vacuum pump 210 (e.g., any suitable pump cable of producing a negative pressure at the suction manifold 206). While illustrated in FIG. 2 as being adjacent to the robotic manipulator 202, the management device 208 and the vacuum pump 210 may also be located remote from the robotic manipulator 202. For example, the management device 208 may form part of a computer station at which the system 200 is implemented or may be located at a different facility altogether (e.g., control signals may be passed over a network connection). In some examples, the vacuum pump 210 may be shared among more than one robotic manipulator 202 (e.g., a single vacuum pump 210 may provide suction for multiple robotic manipulators 202).

The robotic manipulator 202 may be any suitable material handling robot (e.g., Cartesian robot, cylindrical robot, spherical robot, articulated robot, parallel robot, SCARA robot, anthropomorphic robot, any other suitable robotic manipulator and/or robotic arm, automated guided vehicles including lift capabilities, vertical lift modules, gantries, overhead lift modules, and any other suitable material handling equipment that interacts with or otherwise handles objects) that is operable by the management device 208 (e.g., a computing device or other electronic controller).

The robotic manipulator 202 may include any suitable type and number of sensors disposed throughout the robotic manipulator 202 (e.g., sensors in the base, in the arm, in joints in the arm, in an end effector, or in any other suitable location). The sensors can include sensors configured to detect pressure, force, weight, light, objects, slippage, and any other information that may be used to control and/or monitor the operation of the robotic manipulator 202, including the end of arm tool 204. The sensors may include any suitable combination of sensors capable of detecting depth of objects, capturing RGB and other images of objects, scanning machine-readable information, capturing thermal images, detecting position and orientation of objects, and performing any other suitable sensing as described herein.

The end of arm tool 204 can include a rotational joint 212 that enables rotation of a substantial part of the end of arm tool 204 about a tool axis 214, as illustrated by rotational arrows 216. The tool axis 214 is defined as extending axially through a center of the end of arm tool 204. This rotational capability of the end of arm tool 204 enables precise positioning of the suction manifold 206 with respect to a target area of an item. For example, the end of arm tool 204 may be rotatable at least 300 degrees and, in some examples, a full 360 degrees of rotation may be achieved. As the end of arm tool 204 may be rotated in a clockwise and counterclockwise direction, and when combined with the other degrees of freedom of the robotic manipulator 202, the suction manifold 206 may be oriented in almost any suitable rotational orientation. As described herein, rotation of the end of arm tool 204 may be represented as the number of degrees of rotation, which may include a total combined number of degrees in two directions (e.g., 180 degrees of rotation can mean 90 degrees of counterclockwise rotation and 90 degrees of clockwise rotation) or the total number of degrees in one direction (e.g., 180 degrees of rotation can mean 180 degrees of counterclockwise rotation and 180 degrees of clockwise rotation). In some examples, the end of arm tool 204 may provide for infinite degrees of rotation, e.g., the end of arm tool 204 may freely rotate through multiple revolutions in one or both directions.

The picking assembly or end of arm tool 204 can also include the suction manifold 206. The suction manifold 206 includes multiple asymmetrical independently controllable suction zones. Depending on characteristics of a target item, different zones may be turned on and turned off to increase the probability that the target item is picked successfully and adjacent items are left behind. This enables the robotic picking assembly 200 to successfully and efficiently singulate items from a set of items (e.g., a pile items of varying shapes, sizes, and surface properties).

The end of arm tool may also include a compliance mechanism 218. The compliance mechanism 218, which is connected to the suction manifold 206, is configured to provide compliance to the suction manifold 206. In particular, the compliance mechanism 218, which includes one or more springs or other biasing device(s), controls translation of the suction manifold 206 along the tool axis 214, e.g., in the directions indicated by translation arrows 219.

The management device 208 may be configured to manage the operation of the robotic manipulator 202 (e.g., moving the robotic manipulator through different poses and orientations to position the end of arm tool 204), manage operation of the vacuum pump 210 (e.g., turning on and off the pump, adjusting suction levels, etc.), manage the operation of the end of arm tool 204 (e.g., rotating the end of arm tool 204 to align suction zone(s) of the suction manifold 206 with an item), and manage operation of the suction manifold 206 (e.g., opening and closing valves to selectively apply suction in different suction zones of the suction manifold 206). In some examples, the management device 208 may be distributed at one or more locations. For example, a first management device 208 may be local to the robotic manipulator 202 and include hardware and firmware and a second management device 208 may be remote from the robotic manipulator 202 and include software. The management device 208 may include any suitable combination of software, firmware, processors, memory devices, specialized chips, sensors, and the like to implement the techniques described herein. In some examples, the management device 208 receives instructions over a network from a server to perform the techniques described herein.

The robotic picking assembly 200 may be configured to manipulate various types of items such as items having a wide variety of different characteristics. Such items may include, for example, envelopes, bubble mailers, jiffy padded envelopes, personal electronic devices, computers, recreational equipment, food products, television sets, clothing, household supplies, automotive parts, appliances, books, and any other suitable object capable of being manipulated by the robotic picking assembly 200.

Figure 3:
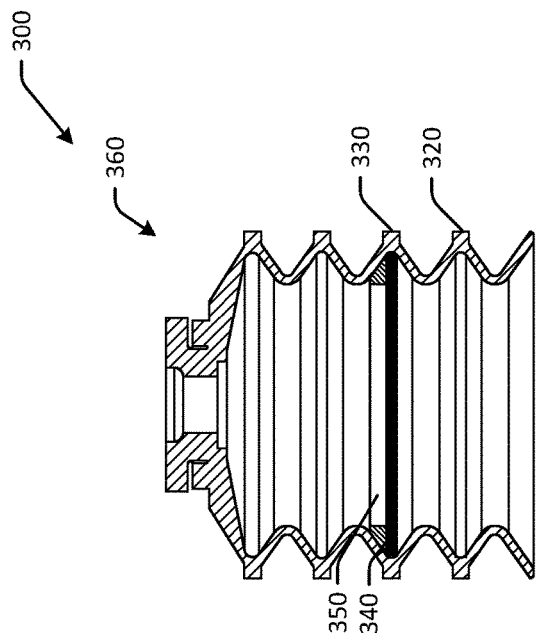
FIG. 3 is a schematic illustration of various suction cup assemblies in accordance with one or more embodiments of the disclosure.
Figure 3:
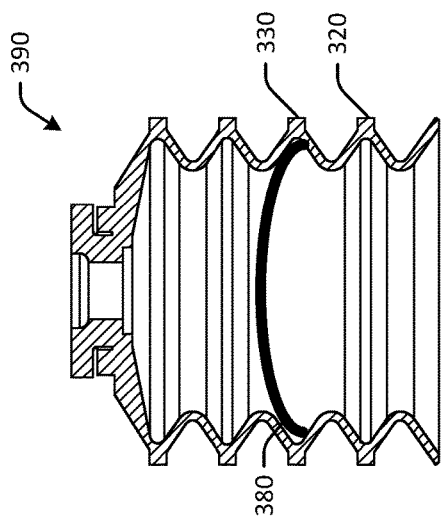
Figure 3:
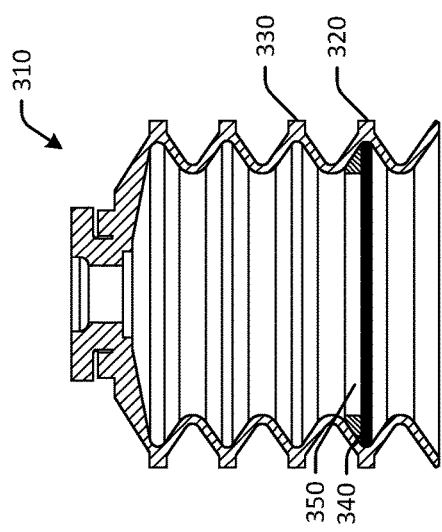
Figure 3:
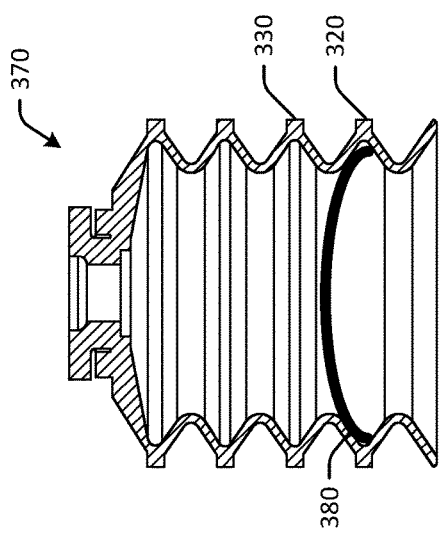

FIG. 3 is a schematic illustration of various suction cup assemblies 300 in accordance with one or more embodiments of the disclosure. Other embodiments may include additional or fewer components. The illustration of FIG. 3 may not be to scale, and may not be illustrated to scale with respect to other figures. The suction cup assemblies illustrated in FIG. 3 may be the same suction cup assemblies discussed with respect to FIGS. 1-2.

In FIG. 3, the suction cup assemblies 300 may be used with a picking assembly to pick up objects of various form factors and with different packaging materials (e.g., loose plastic bag packaging, boxes, etc.), as well as objects of different sizes and shapes, such as cylindrical objects, round objects, etc. Typically, picking up such different items using the same end-of-arm-tool or picking assembly may be difficult due to a number of factors, such as weight shifting during movement of the object (e.g., movement of an object in a loose bag packaging, leading to a change in center of gravity, etc. for the object). In addition, grasping loose packaging may cause the packaging to blister, tear, open, or otherwise become damaged. Unlike typical picking assemblies, robotic picking assemblies described herein may not damage items in loose packaging as a result of including a mesh filter, as well as optional strengthening rings, and the use of particular flow rate suction cups to lift certain items.

The picking assembly used with the suction cup assemblies 300 may be coupled to a vacuum suction system that may provide vacuum flow or negative air pressure to the individual suction cup assemblies. The negative air pressure may flow through the suction cups coupled to the individual suction cup assemblies, which may provide a force that can be used to grasp and lift items out of a container, off of a conveyor, or from another location. To release an item, for example onto a conveyor belt, the negative air pressure may be reduced and/or positive air pressure may be applied.

For example, a picking assembly may be coupled to a vacuum system. The picking assembly may include a first suction cup assembly having a first flow rate, the first suction cup assembly including a first suction cup and a first mesh filter disposed in the first suction cup, and a second suction cup assembly having a second flow rate, the second suction cup assembly including a second suction cup and a second mesh filter disposed in the second suction cup. Some embodiments may include a third suction cup assembly having the second flow rate or a different third flow rate, the third suction cup assembly including a third suction cup and a third mesh filter disposed in the third suction cup. The picking assembly may be configured to move the first suction cup assembly, the second suction cup assembly, and the third suction cup assembly together, and may be configured to grasp a first item based at least in part on the first flow rate and the second flow rate. The picking assembly may be coupled to a robotic manipulator that is configured to move the picking assembly from a first position to a second position.

In a first embodiment 310 of a suction cup assembly, the suction cup assembly may have a first bellow 320, a second bellow 330, and so forth, where another bellow deeper inside the suction cup would be a third bellow, etc. The first embodiment 310 may include a mesh filter 340. The mesh filter 340 may have a number of apertures, and may have a uniform pattern distribution, such as that illustrated in FIG. 4. The mesh filter 340 may be disposed in the first bellow 320 of the suction cup in the first embodiment 310. The mesh filter 340 may be rigid, so as to resist flexing under vacuum pressure. For example, the mesh filter 340 may be formed of a hard plastic, metal, or a different rigid material. In some embodiments, such as the first embodiment 310, one or more compliant rings may be disposed in one or more of the bellows to provide additional support. For example, a compliant ring 350 may be disposed adjacent to the mesh filter 340. The compliant ring 350 may be a strengthening ring disposed about the mesh filter 340. In some embodiments, the strengthening ring may be rigid instead of compliant. The compliant ring 350 may provide structural rigidity for the suction cup and may also secure the mesh filter 340 in position. In the first embodiment, the mesh filter 340 and the optional compliant ring 350 may be disposed in the first bellow 320.

In a second embodiment 360, the suction cup may include the same mesh filter 340 and the optional compliant ring 350. However, the mesh filter 340 and the optional compliant ring 350 may be disposed in the second bellow 330 of the suction cup. The placement of the mesh filter 340 may affect performance of the suction cup. For example, in the second embodiment 360, loose packaging may be sucked further into the suction cup, which may increase a risk of damage to the packaging. However, the second embodiment 360 may also provide improved grip strength relative to the first embodiment 310. The first embodiment 310, however, may have a lower risk of damaging items or packaging than the second embodiment 360.

In a third embodiment 370, the suction cup may include a compliant mesh filter 380 instead of the mesh filter 340 of the first embodiment 310 and the second embodiment 360. The compliant mesh filter 380 may be disposed in the first bellow 320 of the suction cup. The compliant mesh filter 380 may be figured to comply or flex under vacuum pressure. As illustrated in FIG. 3, the compliant mesh filter 380 may bend inwards as vacuum is applied. A compliant mesh filter may provide added grip strength by allowing for more of an item or its packaging to be pulled into the suction cup, but may also increase a risk of damage to the item or its packaging by causing stretching, blistering, rips, etc. The third embodiment 370 may include the optional strengthening ring.

In a fourth embodiment 390, the suction cup may include the same compliant mesh filter 380. However, the compliant mesh filter 380 may be disposed in the second bellow 330 of the suction cup. The placement of the compliant mesh filter 380 may affect performance of the suction cup. For example, in the fourth embodiment 390, loose packaging may be sucked further into the suction cup, which may increase a risk of damage to the packaging. However, the fourth embodiment 390 may also provide improved grip strength relative to the third embodiment 370. The third embodiment 370, however, may have a lower risk of damaging items or packaging than the fourth embodiment 390.

To operate the picking assembly, the picking assembly may, in some embodiments, toggle between a first state of all vacuum flow through a single suction cup, and a second state of vacuum flow through all cups.

Relative to traditional suction technology, the suction cups 300 may provide improved performance in generating an initial seal on a flexible bag or other packaging that could be wrinkled creased or curved, improved performance for maintaining a pressure differential across an imperfect seal reducing the time to reach a low vacuum pressure, and eliminating dwell time for suction cups.

Figure 4:
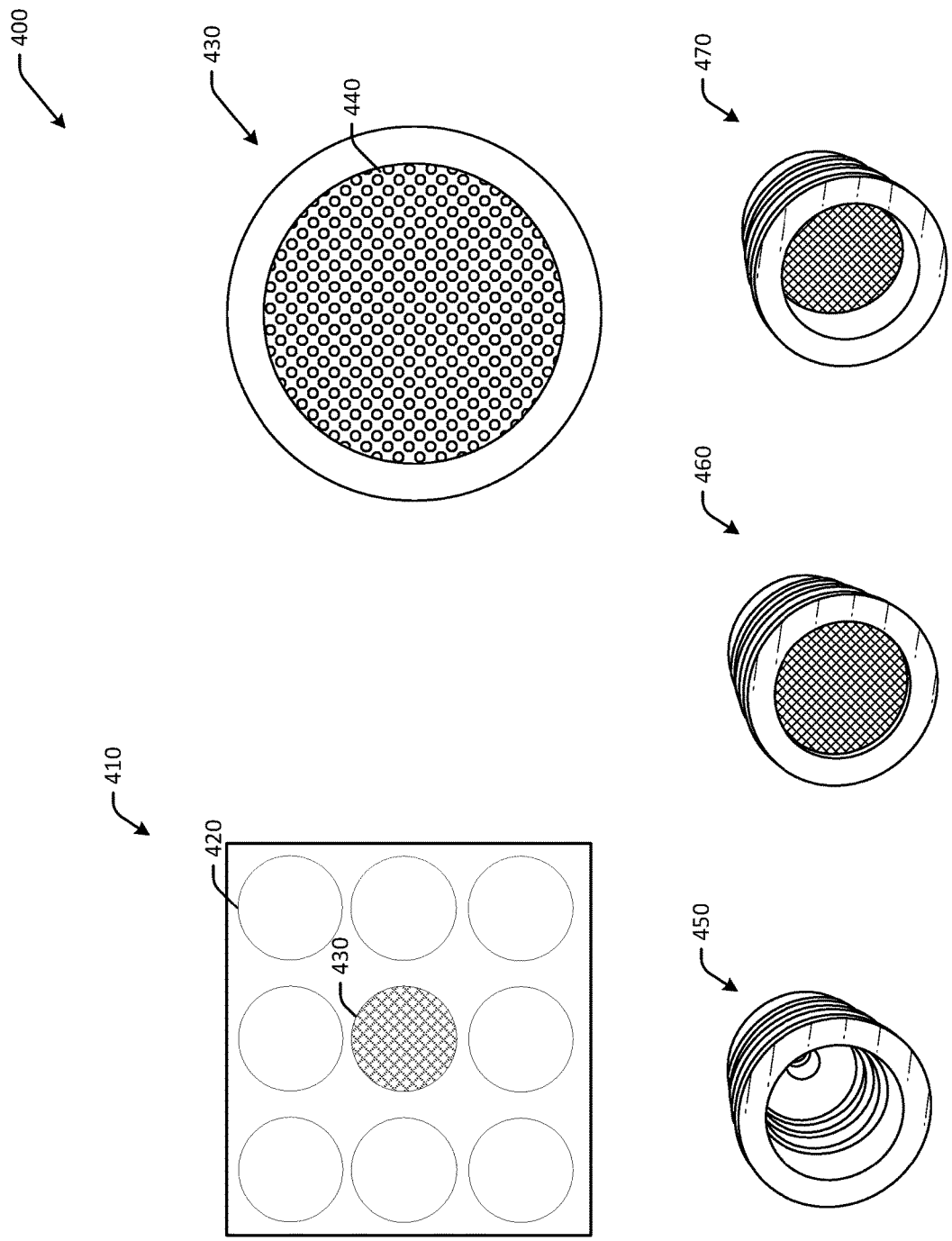
FIG. 4 is a schematic illustration of a picking assembly having a number of suction cup assemblies, along with various mesh filter positions in accordance with one or more embodiments of the disclosure.

FIG. 4 is a schematic illustration 400 of a picking assembly having a number of suction cup assemblies, along with various mesh filter positions in accordance with one or more embodiments of the disclosure. Other embodiments may include additional or fewer components. The illustration of FIG. 4 is not to scale, and may not be illustrated to scale with respect to other figures. The components illustrated in FIG. 4 may be components of the picking assemblies discussed with respect to FIGS. 1-3.

In FIG. 4, a picking assembly 410 is depicted in bottom view. The picking assembly 410 may have a number of different configurations, as discussed with respect to FIG. 7. The picking assembly 410 may include a first suction cup assembly 420 that has a first flow rate, and a second suction cup assembly 430 that has a second flow rate. The other suction cup assemblies may have the first flow rate as well. The different flow rates are depicted with the crosshatching in FIG. 4. In the illustrated example, the second suction cup assembly 430 is disposed in a central position of the picking assembly 410, and the first suction cup assembly 420 is disposed in a perimeter position of the picking assembly 410.

Some or all of the suction cup assemblies may include mesh filters disposed in the respective suction cups. The second flow rate may be greater than the first flow rate. For example, the first flow rate may be about 200 cubic feet per hour, and the second flow rate may be about 1200 cubic feet per hour. In some embodiments, the second flow rate may be at least five times greater than the first flow rate. The difference in flow rates may be achieved in a number of manners, including the use of hardware restrictors to decrease air flow rates. In some embodiments, more than two air flow rates may be used. For example, the picking assembly 410 may include a third suction cup assembly that has a third flow rate that is different from both the first flow rate and the second flow rate. The second suction cup assembly 430 may be disposed at or near a center position of the picking assembly 410. The positioning of the second suction cup assembly 430 may affect the performance of the picking assembly. For example, for heavier items, the surrounding suction cup assemblies may be used to provide additional lift.

The second suction cup assembly 430 is depicted in isolated bottom view. As illustrated, the second suction cup assembly 430 may include a mesh filter 440 disposed in the suction cup. The mesh filter 440 may be disposed at the first bellow, the second bellow, the third bellow, or at another position of the suction cup. In some embodiments, the mesh filter 440 may be rigid (e.g., formed of metal, plastic, etc.), while in other embodiments, the mesh filter 440 may be resilient or flexible (e.g., formed of rubber, etc.). The second suction cup assembly 430 may include one or more optional strengthening rings, which may be compliant rings disposed about a perimeter of a bellow of the second suction cup assembly 430.

For example, in a first embodiment 450 of the second suction cup assembly 430, the second suction cup assembly 430 may include three strengthening rings, respectively disposed about the first, second, and third bellows. The mesh filter is not shown in the illustration of the first embodiment 450 solely to provide clarity on the positioning of the strengthening rings. In a second embodiment 460 of the second suction cup assembly 430, the second suction cup assembly 430 may include the mesh filter 440 disposed at the first bellow of the second suction cup assembly 430. Optional strengthening rings may be used in the second embodiment 460. In a third embodiment 470 of the second suction cup assembly 430, the second suction cup assembly 430 may include the mesh filter 440 disposed at the second bellow of the second suction cup assembly 430. Optional strengthening rings may be used in the third embodiment 470. The first bellow may be the first bellow counted from an open face of the second suction cup assembly 430, with the second bellow being the bellow adjacent to the first bellow and further into the suction cup.

Figure 5:
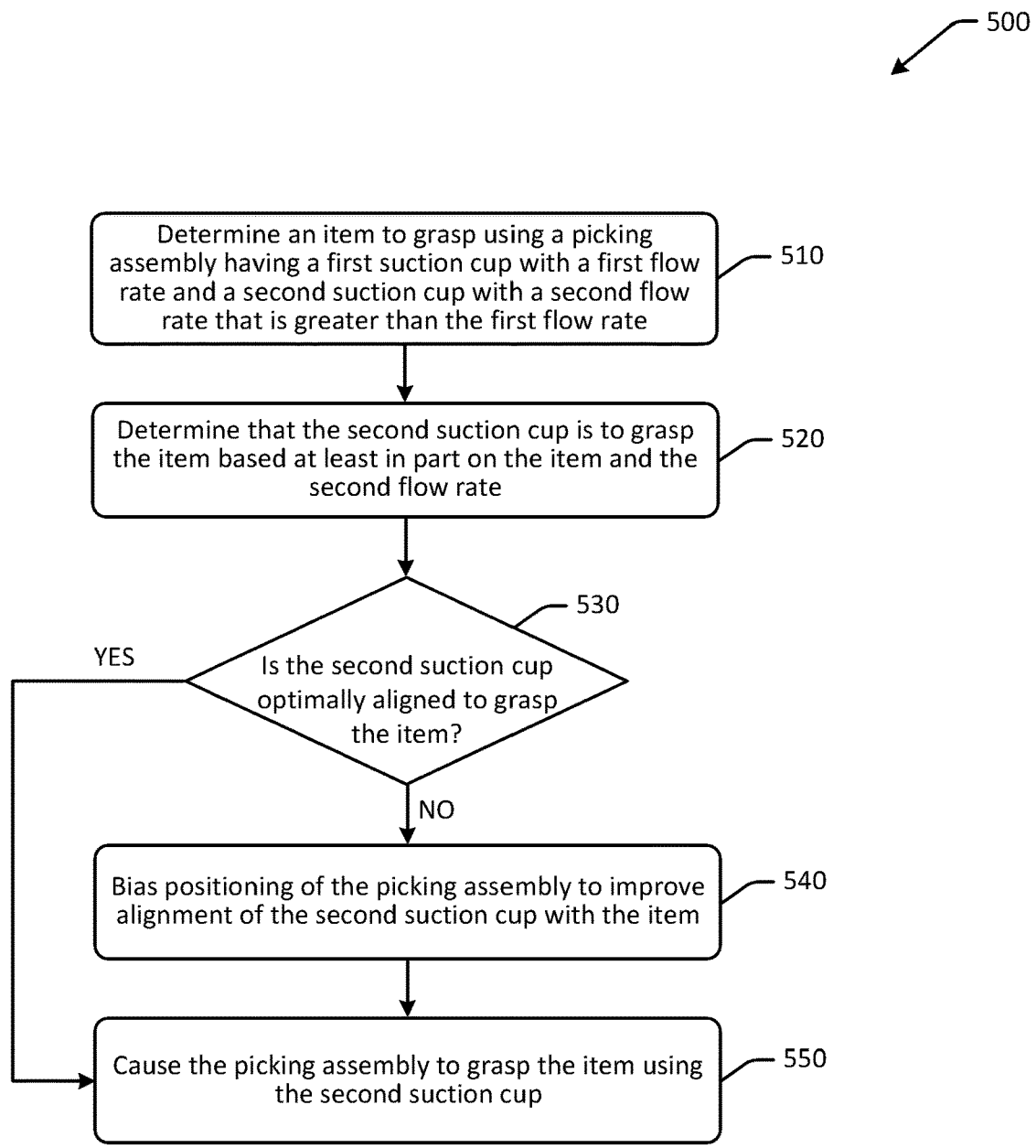
FIG. 5 is a schematic illustration of an example process flow for determining which suction cup assembly is to be used to grasp an item in accordance with one or more embodiments of the disclosure.

FIG. 5 is a schematic illustration of an example process flow 500 for determining which suction cup assembly is to be used to grasp an item in accordance with one or more embodiments of the disclosure. Although example embodiments of the disclosure may be described in the context of a controller, it should be appreciated that the disclosure is more broadly applicable to any computer system in communication with a picking assembly. Some or all of the blocks of the process flows in this disclosure may be performed in a distributed manner across any number of devices. The operations of the process flow 500 may be optional and may be performed in a different order.

At block 510, an item to grasp using a picking assembly may be determined, where the picking assembly includes a first suction cup with a first flow rate and a second suction cup with a second flow rate, where the second flow rate is greater than the first flow rate. For example, a computer system or one or more controllers may determine an item to grasp using a picking assembly, where the picking assembly includes a first suction cup with a first flow rate and a second suction cup with a second flow rate. Any number of suction cups may be included in the picking assembly. Some or all of the different suction cups may have the same or different flow rates. For example, the picking assembly may include suction cups with two different flow rates, three different flow rates, four different flow rates, and so forth. The picking assembly may be configured to grasp items using one or more of the suction cups. To determine the item, the controller may receive image data from one or more cameras, item identifier data from one or more barcode scanners or other sensors, or other identification data from a different computer system or sensor.

At block 520, it may be determined that the second suction cup is to grasp the item based at least in part on the item and the second flow rate. For example, a computer system or one or more controllers may determine that the second suction cup is to grasp the item based at least in part on the item and the second flow rate. The second suction cup may be used instead of the first suction cup. The controller may be configured to select a certain suction cup that is to be used to grasp the item. To determine which suction cup is to be used to grasp the item, the controller may be configured to determine one or more characteristics of the item. For example, using image data (e.g., computer vision processing of an image captured of an item, etc.) and/or an item identifier (e.g., barcode, QR code, etc.), the controller may determine one or more of a type of packaging of the item, a size of the item or its packaging, a shape of the item or packaging, a weight of the item, a positioning of the item relative to an edge of a conveyor, an orientation of the item on a conveyor, and/or other characteristics of the item. The controller may determine, based at least in part on one or more of the characteristics, that a certain flow rate is optimal to grasp the item (e.g., based on the available flow rates at the picking assembly, etc.), and may therefore determine that the suction cup with the corresponding flow rate is to be used to grasp the item. The controller may therefore determine which of the suction cup(s) at the picking assembly is to be used to grasp the item.

In some embodiments, the controller may be configured to identify the first item using one or more sensors. The controller may be configured to determine that the item is to be grasped using the first suction cup assembly or the second suction cup assembly based at least in part on the first flow rate and the one or more characteristics.

At determination block 530, a determination may be made as to whether the second suction cup is optimally aligned to grasp the item. For example, a computer system or one or more controllers may determine whether the second suction cup is optimally aligned to grasp the item. Optimal alignment of the second suction cup may be determined based at least in part on positioning of the second suction cup relative to the picking assembly, as well as a target grasp area of the item. For example, the picking assembly may be configured to grasp items at a default position where a center of the picking assembly is aimed towards a target area of an item (e.g., which may be a center of the item, etc.). However, if the second suction cup is not disposed at or near a center of the picking assembly, the second suction cup may not be optimally aligned with the item, and the determination at determination block 530 may be negative. If the second suction cup is disposed at or near a center of the picking assembly, the second suction cup may be optimally aligned with the item even with default positioning, and the determination at determination block 530 may be positive. Other factors, such as placement of the item relative to edges or boundaries of a conveyor, container, or other surface may affect the determination at block 530 as well. For example, if the item is disposed close to an edge, or the target grasp area is small in size, the second suction cup may or may not be optimally aligned.

If it is determined at determination block 530 that the second suction cup is optimally aligned to grasp the item, the determination at block 530 may be positive and the process flow may proceed to block 550. If it is determined at determination block 530 that the second suction cup is not optimally aligned to grasp the item, the determination at block 530 may be negative and the process flow may proceed to block 540.

At block 540, positioning of the picking assembly may be biased to improve alignment of the second suction cup with the item. For example, a computer system or one or more controllers may cause positioning of the picking assembly to be biased to improve alignment of the second suction cup with the item. In some instances, biasing of the picking assembly may cause the picking assembly to move from a default alignment position where the center of the picking assembly is aligned with the item to an offset alignment position where the second suction cup is aligned with the item. For example, if the second suction cup is disposed at a corner of the picking assembly, the positioning of the picking assembly may be modified such that the corner is aligned with the target area of the item. The picking assembly may return to the default alignment after grasping of the item is completed.

For example, the first suction cup assembly may be disposed between the second suction cup assembly and a third suction cup assembly (e.g., such that the second suction cup is in a non-center position, a perimeter position, etc.), and the controller may therefore be configured to: cause the picking assembly to offset a default picking position to align the second suction cup assembly with the item, where the default picking position may be to align the first suction cup assembly with the item.

At block 550, the picking assembly may be caused to grasp the item using the second suction cup. For example, a computer system or one or more controllers may cause the picking assembly to grasp the item using the second suction cup. The controller may cause the picking assembly to position itself aligned with a target area of the item, and to grasp the item using vacuum suction. In instances where the item has loose packaging, a portion of the loose packaging may be sucked into the suction cup, but the packaging may not be damaged due to the mesh filters disposed inside the suction cups.

In some embodiments, the controller may cause vacuum pressure to be directed to the suction cup assembly to cause the item to be grasped, and the controller may prevent vacuum pressure from being directed to the second suction cup assembly and other suction cup assemblies to increase a flow rate of the second suction cup.

In other embodiments, the controller may be in communication with a picking assembly, and may determine a first item to grasp using the picking assembly, where the picking assembly includes a first suction cup assembly that has a first flow rate, and a second suction cup assembly that has a second flow rate. The controller may be configured to determine one or more characteristics associated with the first item, and may determine that the first item is to be grasped using the first suction cup assembly based at least in part on the first flow rate and the one or more characteristics. The controller may cause the picking assembly to grasp the first item using the first suction cup assembly.

Figure 6:
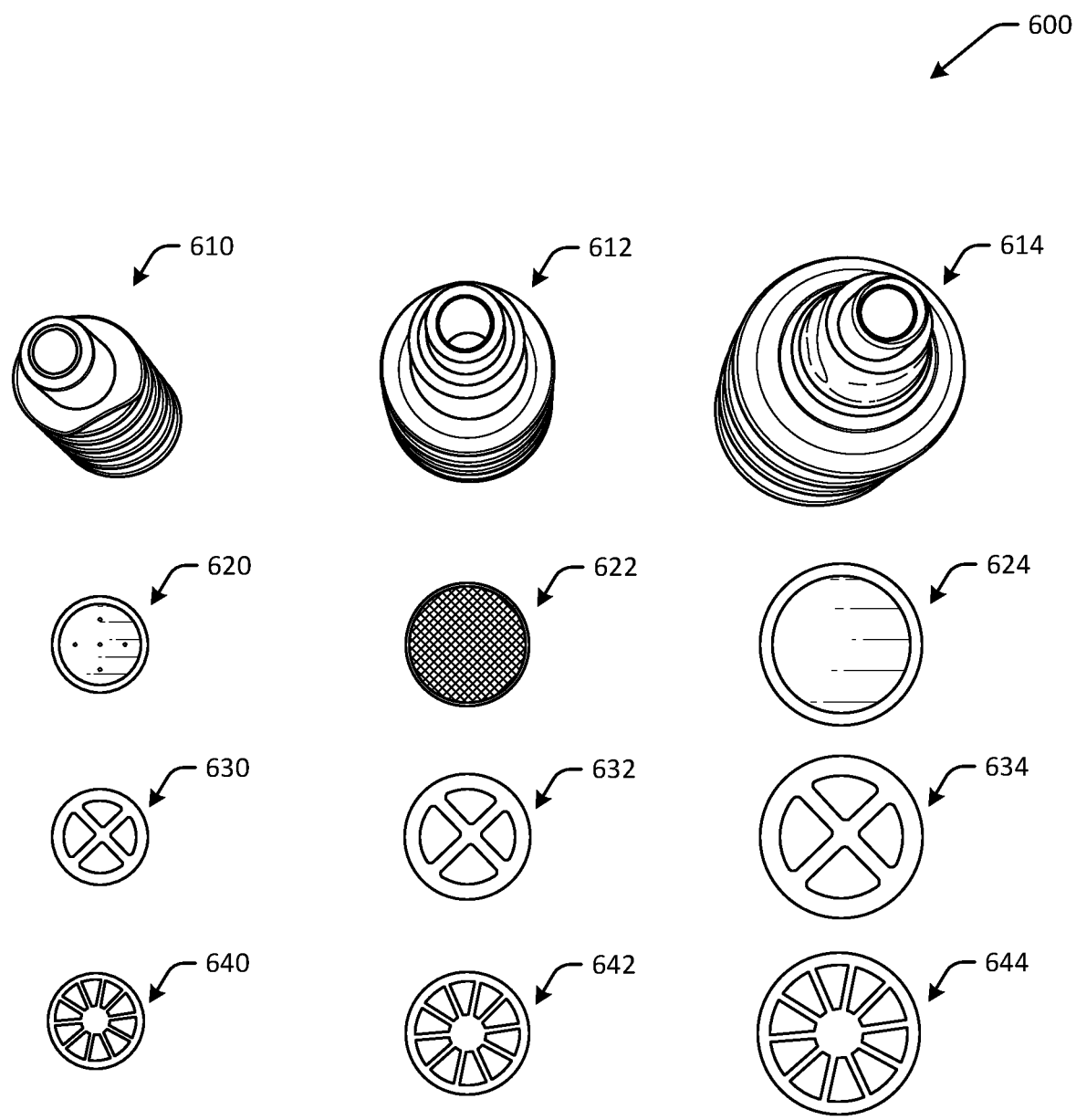
FIG. 6 is a schematic illustration of various suction cup assembly components in accordance with one or more embodiments of the disclosure.

FIG. 6 is a schematic illustration of various suction cup assembly components 600 in accordance with one or more embodiments of the disclosure. Other embodiments may include additional or fewer components. The illustration of FIG. 6 is not to scale, and may not be illustrated to scale with respect to other figures. The components illustrated in FIG. 6 may be components of the picking assemblies and/or suction cup assemblies discussed with respect to FIGS. 1-5.

In FIG. 6, a number of different sizes of suction cups are depicted with various types of mesh filters in corresponding sizes. Any of the suction cups may be used with the different mesh filters disposed at the first bellow or the second bellow of the respective suction cup. For example, a first suction cup 610 may have a small diameter, a second suction cup 612 may have a medium diameter, and a third suction cup 614 may have a large diameter.

The first suction cup 610 may be used with any one of a first mesh filter 620, a second mesh filter 630, or a third mesh filter 640. The first mesh filter 620 may have a uniform pattern or distribution of apertures. The apertures may have a uniform or non-uniform geometry, such as circular, triangular, rectangular, and so forth. The second mesh filter 630 may have larger apertures than the first mesh filter 620, and the apertures may be triangular. The third mesh filter 640 may have smaller apertures than the second mesh filter 630, and larger apertures than the first mesh filter 630. The different mesh filters may provide different performance. For example, the first mesh filter 630 may provide the lowest risk of damage to packages. The second mesh filter 630, however, may cause bubbling of loose packaging material, which may cause stretching and/or damage to the packaging material. The different mesh filters may perform differently based on a diameter of the suction cup as well.

The second suction cup 612 may be used with any one of a first mesh filter 622, a second mesh filter 632, or a third mesh filter 642. The first mesh filter 622 may have a uniform distribution of apertures. The apertures may have a uniform or non-uniform geometry, such as circular, triangular, rectangular, and so forth. The second mesh filter 632 may have larger apertures than the first mesh filter 622, and the apertures may be triangular. The third mesh filter 642 may have smaller apertures than the second mesh filter 632, and larger apertures than the first mesh filter 632. The different mesh filters may provide different performance. For example, the first mesh filter 632 may provide the lowest risk of damage to packages. The second mesh filter 632, however, may cause bubbling of loose packaging material, which may cause stretching and/or damage to the packaging material. The different mesh filters may perform differently based on a diameter of the suction cup as well.

The third suction cup 614 may be used with any one of a first mesh filter 624, a second mesh filter 634, or a third mesh filter 644. The first mesh filter 624 may have a uniform distribution of apertures. The apertures may have a uniform or non-uniform geometry, such as circular, triangular, rectangular, and so forth. The second mesh filter 634 may have larger apertures than the first mesh filter 624, and the apertures may be triangular. The third mesh filter 644 may have smaller apertures than the second mesh filter 634, and larger apertures than the first mesh filter 634. The different mesh filters may provide different performance. For example, the first mesh filter 634 may provide the lowest risk of damage to packages. The second mesh filter 634, however, may cause bubbling of loose packaging material, which may cause stretching and/or damage to the packaging material. The different mesh filters may perform differently based on a diameter of the suction cup as well.

Any one of the suction cups may be used with a picking assembly coupled to a vacuum system. The picking assembly may include a first suction cup assembly having a first flow rate, the first suction cup assembly including a first suction cup and a first mesh filter disposed in the first suction cup, and a second suction cup assembly having a second flow rate, the second suction cup assembly including a second suction cup and a second mesh filter disposed in the second suction cup. The picking assembly may optionally include a third suction cup assembly having the second flow rate, the third suction cup assembly including a third suction cup and a third mesh filter disposed in the third suction cup. The picking assembly may be configured to move the first suction cup assembly, the second suction cup assembly, and the optional third suction cup assembly together. The picking assembly may be configured to grasp a first item based at least in part on the first flow rate and the second flow rate.

Figure 7:
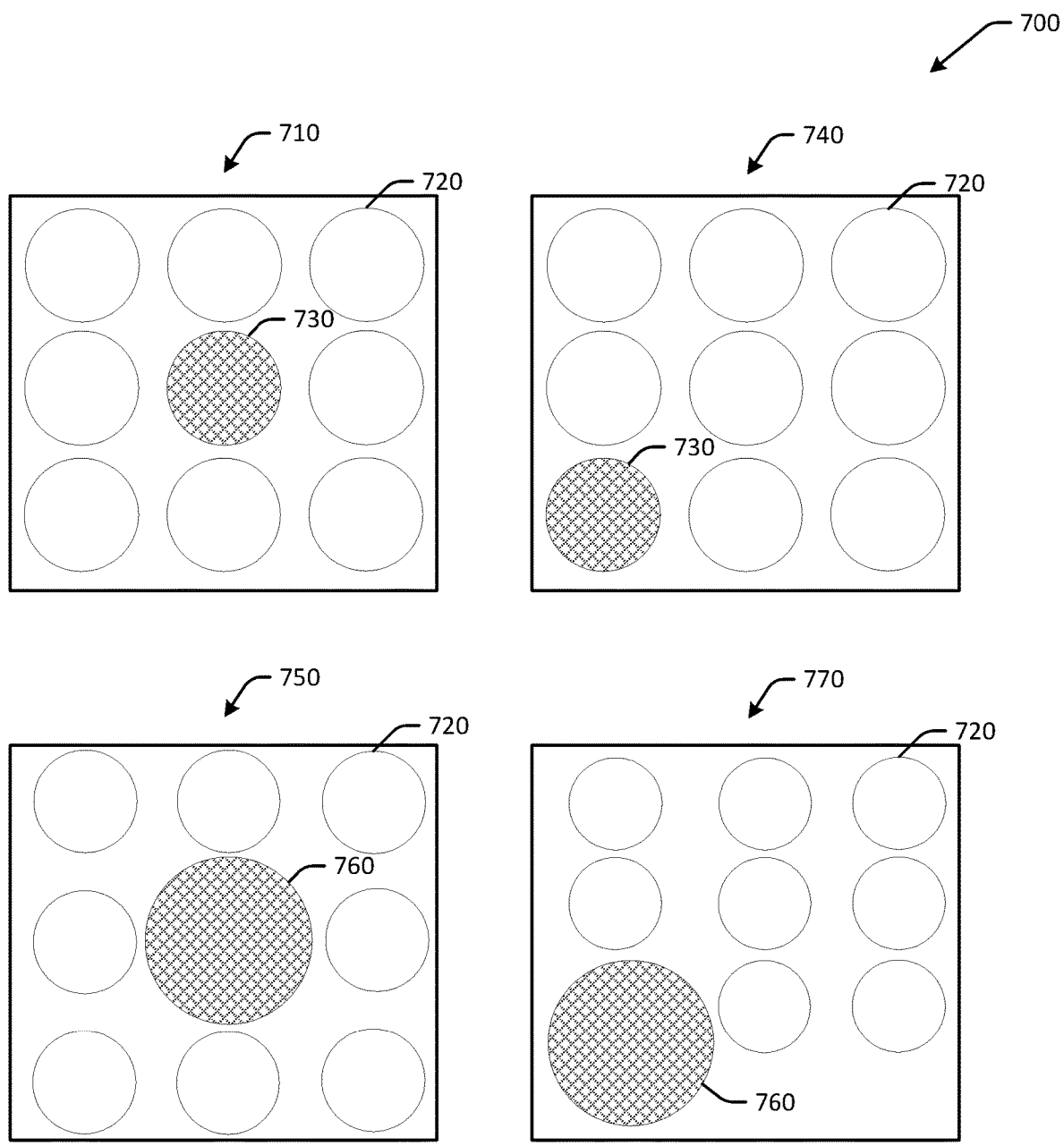
FIG. 7 is a schematic illustration of picking assemblies having different configurations in accordance with one or more embodiments of the disclosure.

FIG. 7 is a schematic illustration of picking assemblies 700 having different configurations in accordance with one or more embodiments of the disclosure. Other embodiments may include additional or fewer components. The illustration of FIG. 7 is not to scale, and may not be illustrated to scale with respect to other figures. Any of the configurations illustrated in FIG. 7 may be used with the picking assemblies discussed with respect to FIGS. 1-6.

In FIG. 7, a number of different picking assembly configurations are depicted in bottom view. Although depicted as a three by three arrangement of suction cup assemblies, any number of suction cup assemblies may be used. In addition, other formats of picking assemblies may be used instead of the array-based format depicted in FIG. 7, such as linear arrangements of suction cup assemblies, circular arrangements of suction cup assemblies, triangular arrangements of suction cup assemblies, and other formats. Depending on the use or application of a particular picking assembly, any of the picking assembly configurations may be selected.

In a first configuration 710, a picking assembly may include a first suction cup assembly 720 that has a first flow rate, and a second suction cup assembly 730 that has a second flow rate. The other suction cup assemblies depicted in the first configuration 710 may have the first flow rate as well. The different flow rates are depicted with the crosshatching in FIG. 7. Some or all of the suction cup assemblies may include mesh filters disposed in the respective suction cups. The second flow rate may be greater than the first flow rate. For example, the first flow rate may be about 200 cubic feet per hour, and the second flow rate may be about 1200 cubic feet per hour. In some embodiments, the second flow rate may be at least five times greater than the first flow rate. The difference in flow rates may be achieved in a number of manners, including the use of hardware restrictors to decrease air flow rates. In some embodiments, more than two air flow rates may be used. For example, the picking assembly may include a third suction cup assembly that has a third flow rate that is different from both the first flow rate and the second flow rate. In the first configuration 710, the second suction cup assembly 730 may be disposed at or near a center position of the picking assembly. The positioning of the second suction cup assembly 730 may affect the performance of the picking assembly, as discussed below. For example, for heavier items, the surrounding suction cup assemblies may be used to provide additional lift.

In a second configuration 740, the picking assembly may include the first suction cup assembly 720 that has the first flow rate, and the second suction cup assembly 730 that has a second flow rate. The other suction cup assemblies depicted in the second configuration 740 may have the first flow rate as well. The different flow rates are depicted with the crosshatching in FIG. 7. Some or all of the suction cup assemblies may include mesh filters disposed in the respective suction cups. However, unlike in the first configuration 710, the second suction cup assembly 730 may be disposed at or near a corner position (or another perimeter position) of the picking assembly. The positioning of the second suction cup assembly 730 may affect the performance of the picking assembly, as discussed below. For example, alignment of the second suction cup assembly 730 with an item may be difficult and/or limited depending on item location.

In a third configuration 750, the picking assembly may include the first suction cup assembly 720 that has the first flow rate, and a second suction cup assembly 760 that has a second flow rate. The other suction cup assemblies depicted in the third configuration 750 may have the first flow rate as well. The different flow rates are depicted with the crosshatching in FIG. 7. Some or all of the suction cup assemblies may include mesh filters disposed in the respective suction cups. However, unlike in the first configuration 710 and the second configuration 740, the second suction cup assembly 760 may include a suction cup that is larger in size than the other suction cup assemblies. The larger size may provide additional utility when using the high flow suction cup. The second suction cup assembly 760 may be disposed at or near a center position of the picking assembly. The positioning of the second suction cup assembly 760 may affect the performance of the picking assembly, as discussed below. For example, for heavier items, the surrounding suction cup assemblies may be used to provide additional lift.

In a fourth configuration 770, the picking assembly may include the first suction cup assembly 720 that has the first flow rate, and the second suction cup assembly 760 that has a second flow rate. The other suction cup assemblies depicted in the fourth configuration 770 may have the first flow rate as well. The different flow rates are depicted with the crosshatching in FIG. 7. Some or all of the suction cup assemblies may include mesh filters disposed in the respective suction cups. However, unlike in the first configuration 710 and the second configuration 740, the second suction cup assembly 760 may include a suction cup that is larger in size than the other suction cup assemblies. The larger size may provide additional utility when using the high flow suction cup. The second suction cup assembly 760 may be disposed at or near a corner position (or another perimeter position) of the picking assembly. The positioning of the second suction cup assembly 760 may affect the performance of the picking assembly, as discussed below. For example, alignment of the second suction cup assembly 730 with an item may be difficult and/or limited depending on item location.

The different configurations may provide different benefits and/or impact performance of the picking assembly differently. For example, positioning of a certain suction cup assembly, such as a suction cup assembly having a relatively high flow rate, in a middle or center positon of the picking assembly may provide the benefit of allowing for surrounding suction cup assemblies to be used in conjunction with the high flow rate suction cup to provide added suction strength to lift heavy objects. However, use of the high flow suction cup along edges of a conveyor belt may be limited due to the central positioning of the high flow suction cup. For example, the low flow suction cups positioned along the perimeter of the picking assembly may be better able to access items along the lateral edges of the conveyor belt.

In another instance, positioning of the high flow suction cup(s) along the perimeter of the picking assembly may provide flexibility to access items on the edges of a conveyor, but may result in an offset positioning of the high flow suction cup when the picking assembly is used to grasp an item. For example, the picking assembly may be aligned with an item by aligning a center suction cup of the picking assembly with the item, and if the high flow suction cup is to be used to grasp the item, and the high flow suction cup is positioned at the perimeter of the picking assembly, alignment of the center suction cup with the item may result in an offset alignment of the high flow suction cup with the item. Offset alignment may cause issues like failed grasp attempts, damage to items or packaging, and the like. To overcome this potential issue, the picking assembly may be biased to offset from a default picking position to align the high flow suction cup with the item instead of the center suction cup, as discussed with respect to FIG. 5. Accordingly, a number of different configurations of picking assemblies may be used, with different flow rate suction cups positioned in different positions of the picking assembly.

One or more operations of the methods, process flows, or use cases of FIGS. 1-7 may have been described above as being performed by a user device, or more specifically, by one or more program module(s), applications, or the like executing on a device. It should be appreciated, however, that any of the operations of the methods, process flows, or use cases of FIGS. 1-7 may be performed, at least in part, in a distributed manner by one or more other devices, or more specifically, by one or more program module(s), applications, or the like executing on such devices. In addition, it should be appreciated that processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-7 may be described in the context of the illustrative devices, it should be appreciated that such operations may be implemented in connection with numerous other device configurations.

The operations described and depicted in the illustrative methods, process flows, and use cases of FIGS. 1-7 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-7 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 8:
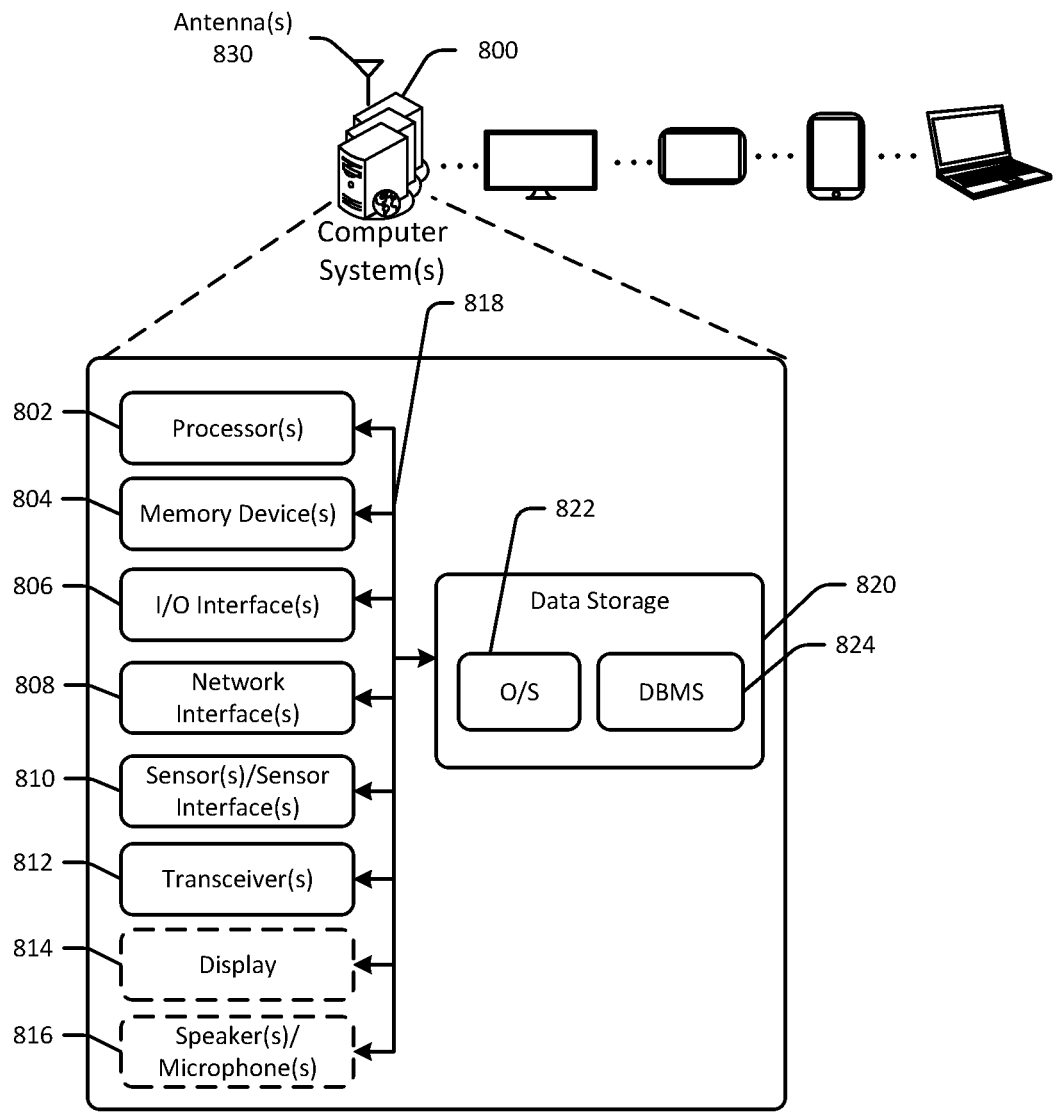
FIG. 8 schematically illustrates an example architecture of a controller associated with an item picking system in accordance with one or more embodiments of the disclosure.

FIG. 8 is a schematic block diagram of one or more illustrative controller(s) or computer system(s) 800 in accordance with one or more example embodiments of the disclosure. The computer system(s) 800 may include any suitable computing device including, but not limited to, a server system, a voice interaction device, a mobile device such as a smartphone, a tablet, an e-reader, a wearable device, or the like; a desktop computer; a laptop computer; a content streaming device; or the like. The computer system(s) 800 may correspond to an illustrative device configuration for the controller(s) discussed with respect to any one of FIGS. 1-7. For example, the computer system(s) 800 may control one or more aspects of the robotic picking assemblies with different concurrent flow rates described in FIGS. 1-7, such as determining which suction cup assemblies to grasp an item with, control flow rates, determine which suction cup assemblies are to be provided positive or negative air pressure, determine where a robotic arm or other device is to position a picking assembly, and so forth.

The computer system(s) 800 may be configured to communicate with one or more servers, user devices, cameras, or the like. The computer system(s) 800 may be configured to identify items, retrieve items, move items, and so forth.

The computer system(s) 800 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computer system(s) 800 may include one or more processors (processor(s)) 802, one or more memory devices 804 (also referred to herein as memory 804), one or more input/output (I/O) interface(s) 806, one or more network interface(s) 808, one or more sensor(s) or sensor interface(s) 810, one or more transceiver(s) 812, one or more optional display(s) 814, one or more optional microphone(s) 816, and data storage 820. The computer system(s) 800 may further include one or more bus(es) 818 that functionally couple various components of the computer system(s) 800. The computer system(s) 800 may further include one or more antenna(s) 830 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 818 may include at least one of a system bus, a memory bus, an address bus, or a message bus, and may permit the exchange of information (e.g., data (including computer-executable code), signaling, etc.) between various components of the computer system(s) 800. The bus(es) 818 may include, without limitation, a memory bus or a memory controller, a peripheral bus, an accelerated graphics port, and so forth. The bus(es) 818 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 804 of the computer system(s) 800 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 804 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 804 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 820 may include removable storage and/or non-removable storage including, but not limited to, magnetic storage, optical disk storage, and/or tape storage. The data storage 820 may provide non-volatile storage of computer-executable instructions and other data. The memory 804 and the data storage 820, removable and/or non-removable, are examples of computer-readable storage media (CRSM) as that term is used herein.

The data storage 820 may store computer-executable code, instructions, or the like that may be loadable into the memory 804 and executable by the processor(s) 802 to cause the processor(s) 802 to perform or initiate various operations. The data storage 820 may additionally store data that may be copied to the memory 804 for use by the processor(s) 802 during the execution of the computer-executable instructions. Moreover, output data generated as a result of execution of the computer-executable instructions by the processor(s) 802 may be stored initially in the memory 804, and may ultimately be copied to the data storage 820 for non-volatile storage.

More specifically, the data storage 820 may store one or more operating systems (O/S) 822; one or more database management systems (DBMS) 824; and one or more program module(s), applications, engines, computer-executable code, scripts, or the like. Some or all of these module(s) may be sub-module(s). Any of the components depicted as being stored in the data storage 820 may include any combination of software, firmware, and/or hardware. The software and/or firmware may include computer-executable code, instructions, or the like that may be loaded into the memory 804 for execution by one or more of the processor(s) 802. Any of the components depicted as being stored in the data storage 820 may support functionality described in reference to corresponding components named earlier in this disclosure.

The data storage 820 may further store various types of data utilized by the components of the computer system(s) 800. Any data stored in the data storage 820 may be loaded into the memory 804 for use by the processor(s) 802 in executing computer-executable code. In addition, any data depicted as being stored in the data storage 820 may potentially be stored in one or more datastore(s) and may be accessed via the DBMS 824 and loaded in the memory 804 for use by the processor(s) 802 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 802 may be configured to access the memory 804 and execute the computer-executable instructions loaded therein. For example, the processor(s) 802 may be configured to execute the computer-executable instructions of the various program module(s), applications, engines, or the like of the computer system(s) 800 to cause or facilitate various operations to be performed in accordance with one or more embodiments of the disclosure. The processor(s) 802 may include any suitable processing unit capable of accepting data as input, processing the input data in accordance with stored computer-executable instructions, and generating output data. The processor(s) 802 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 802 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 802 may be capable of supporting any of a variety of instruction sets.

Referring now to other illustrative components depicted as being stored in the data storage 820, the O/S 822 may be loaded from the data storage 820 into the memory 804 and may provide an interface between other application software executing on the computer system(s) 800 and the hardware resources of the computer system(s) 800. More specifically, the O/S 822 may include a set of computer-executable instructions for managing the hardware resources of the computer system(s) 800 and for providing common services to other application programs (e.g., managing memory allocation among various application programs). In certain example embodiments, the O/S 822 may control execution of the other program module(s). The O/S 822 may include any operating system now known or which may be developed in the future including, but not limited to, any server operating system, any mainframe operating system, or any other proprietary or non-proprietary operating system.

The DBMS 824 may be loaded into the memory 804 and may support functionality for accessing, retrieving, storing, and/or manipulating data stored in the memory 804 and/or data stored in the data storage 820. The DBMS 824 may use any of a variety of database models (e.g., relational model, object model, etc.) and may support any of a variety of query languages. The DBMS 824 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computer system(s) 800 is a mobile device, the DBMS 824 may be any suitable lightweight DBMS optimized for performance on a mobile device.

Referring now to other illustrative components of the computer system(s) 800, the input/output (I/O) interface(s) 806 may facilitate the receipt of input information by the computer system(s) 800 from one or more I/O devices as well as the output of information from the computer system(s) 800 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computer system(s) 800 or may be separate. The I/O devices may further include, for example, any number of peripheral devices such as data storage devices, printing devices, and so forth.

The I/O interface(s) 806 may also include an interface for an external peripheral device connection such as universal serial bus (USB), FireWire, Thunderbolt, Ethernet port or other connection protocol that may connect to one or more networks. The I/O interface(s) 806 may also include a connection to one or more of the antenna(s) 830 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The computer system(s) 800 may further include one or more network interface(s) 808 via which the computer system(s) 800 may communicate with any of a variety of other systems, platforms, networks, devices, and so forth. The network interface(s) 808 may enable communication, for example, with one or more wireless routers, one or more host servers, one or more web servers, and the like via one or more networks.

The antenna(s) 830 may include any suitable type of antenna depending, for example, on the communications protocols used to transmit or receive signals via the antenna(s) 830. Non-limiting examples of suitable antennas may include directional antennas, non-directional antennas, dipole antennas, folded dipole antennas, patch antennas, multiple-input multiple-output (MIMO) antennas, or the like. The antenna(s) 830 may be communicatively coupled to one or more transceivers 812 or radio components to which or from which signals may be transmitted or received.

As previously described, the antenna(s) 830 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 830 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(s) 830 may be configured to transmit or receive radio frequency signals within any suitable frequency range forming part of the unlicensed portion of the radio spectrum.

The antenna(s) 830 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 812 may include any suitable radio component(s) for—in cooperation with the antenna(s) 830—transmitting or receiving radio frequency (RF) signals in the bandwidth and/or channels corresponding to the communications protocols utilized by the computer system(s) 800 to communicate with other devices. The transceiver(s) 812 may include hardware, software, and/or firmware for modulating, transmitting, or receiving—potentially in cooperation with any of antenna(s) 830—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 812 may further include hardware, firmware, or software for receiving GNSS signals. The transceiver(s) 812 may include any known receiver and baseband suitable for communicating via the communications protocols utilized by the computer system(s) 800. The transceiver(s) 812 may further include a low noise amplifier (LNA), additional signal amplifiers, an analog-to-digital (A/D) converter, one or more buffers, a digital baseband, or the like.

The sensor(s)/sensor interface(s) 810 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The optional display(s) 814 may be configured to output light and/or render content. The optional speaker(s)/microphone(s) 816 may be any device configured to receive analog sound input or voice data.

It should be appreciated that the program module(s), applications, computer-executable instructions, code, or the like depicted in FIG. 8 as being stored in the data storage 820 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computer system(s) 800, and/or hosted on other computing device(s) accessible via one or more networks, may be provided to support functionality provided by the program module(s), applications, or computer-executable code depicted in FIG. 8 and/or additional or alternate functionality. Further, functionality may be modularized differently such that processing described as being supported collectively by the collection of program module(s) depicted in FIG. 8 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 8 may be implemented, at least partially, in hardware and/or firmware across any number of devices.

It should further be appreciated that the computer system(s) 800 may include alternate and/or additional hardware, software, or firmware components beyond those described or depicted without departing from the scope of the disclosure. More particularly, it should be appreciated that software, firmware, or hardware components depicted as forming part of the computer system(s) 800 are merely illustrative and that some components may not be present or additional components may be provided in various embodiments. While various illustrative program module(s) have been depicted and described as software module(s) stored in the data storage 820, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A robotic picking assembly comprising:
a robotic manipulator;
a vacuum suction system configured to provide negative air pressure;
a picking assembly coupled to the robotic manipulator and the vacuum suction system, the picking assembly configured to pick up and release individual items, the picking assembly comprising:
a first suction cup assembly having a first flow rate, the first suction cup assembly comprising a first suction cup and a first mesh filter disposed in the first suction cup;
a second suction cup assembly having a second flow rate, the second suction cup assembly comprising a second suction cup and a second mesh filter disposed in the second suction cup, wherein the first flow rate is at least five times greater than the second flow rate, and wherein the second suction cup assembly is a center suction cup assembly; and
a third suction cup assembly having a third flow rate, the third suction cup assembly comprising a third suction cup and a third mesh filter disposed in the third suction cup, wherein the first suction cup, the second suction cup, and the third suction cup have a same diameter;
wherein the first flow rate, second flow rate, and third flow rate are different flow rates;
wherein the picking assembly is configured to move the first suction cup assembly, the second suction cup assembly, and the third suction cup assembly together; and
a controller configured to:
identify a first item;
determine one or more characteristics of the first item; and
determine that the item is to be grasped using the first suction cup assembly instead of the second suction cup assembly based at least in part on the first flow rate and the one or more characteristics.

2. The robotic picking assembly of claim 1, wherein the first suction cup assembly is disposed in a central position of the robotic picking assembly, and wherein the second suction cup assembly and the third suction cup assembly are disposed in perimeter positions of the robotic picking assembly.

3. The robotic picking assembly of claim 1, further comprising:
a first strengthening ring disposed about the first mesh filter;
a second strengthening ring disposed about the second mesh filter; and a third strengthening ring disposed about the third mesh filter;

wherein the respective mesh filters have a uniform pattern.

4. The robotic picking assembly of claim 1, wherein the second suction cup assembly is disposed between the first suction cup assembly and the third suction cup assembly, and wherein the controller is further configured to:

cause the picking assembly to offset a default picking position to align the first suction cup assembly with the first item.

5. A system comprising:

a picking assembly coupled to a vacuum system, the picking assembly comprising:
  a first suction cup assembly having a first flow rate, the first suction cup assembly comprising a first suction cup and a first mesh filter disposed in the first suction cup;
  a second suction cup assembly having a second flow rate, the second suction cup assembly comprising a second suction cup and a second mesh filter disposed in the second suction cup, wherein the second suction cup assembly is a center suction cup assembly; and
  a third suction cup assembly having the second flow rate, the third suction cup assembly comprising a third suction cup and a third mesh filter disposed in the third suction cup, wherein the first flow rate, second flow rate, and third flow rate are different flow rates, and wherein the first suction cup, the second suction cup, and the third suction cup have a same diameter;
wherein the picking assembly is configured to move the first suction cup assembly, the second suction cup assembly, and the third suction cup assembly together, and wherein the picking assembly is configured to grasp a first item using the first suction cup assembly instead of the second suction cup assembly based at least in part on the first flow rate and the second flow rate.

6. The system of claim 5, further comprising:

a controller configured to:
  identify the first item;
  determine one or more characteristics of the first item; and
  determine that the item is to be grasped using the first suction cup assembly based at least in part on the first flow rate and the one or more characteristics.

7. The system of claim 6, wherein the one or more characteristics comprise a packaging of the first item.

8. The system of claim 6, wherein the controller is further configured to:

cause vacuum pressure to be directed to the first suction cup assembly; and prevent vacuum pressure from being directed to the second suction cup assembly and the third suction cup assembly.

9. The system of claim 6, wherein the second suction cup assembly is disposed between the first suction cup assembly and the third suction cup assembly, and wherein the controller is further configured to:

cause the picking assembly to offset a default picking position to align the first suction cup assembly with the first item.

10. The system of claim 9, wherein the default picking position is to align the second suction cup assembly with the first item.

11. The system of claim 5, wherein the first mesh filter is disposed in a first bellow of the first suction cup, the second mesh filter is disposed in a second bellow of the second suction cup, and the third mesh filter is disposed in a second bellow of the third suction cup.

12. The system of claim 5, further comprising:

a first strengthening ring disposed about the first mesh filter;

a second strengthening ring disposed about the second mesh filter; and a third strengthening ring disposed about the third mesh filter.

13. The system of claim 5, wherein the first mesh filter, the second mesh filter, and the third mesh filter are compliant mesh filters.

14. The system of claim 5, wherein the first flow rate is at least five times greater than the second flow rate.

15. The system of claim 5, further comprising:

a fourth suction cup assembly having a third flow rate, the fourth suction cup assembly comprising a fourth suction cup and a fourth mesh filter disposed in the fourth suction cup, wherein the first suction cup, the second suction cup, the third suction cup, and the fourth suction cup have the same diameter.

16. The system of claim 5, further comprising:

a robotic manipulator coupled to the picking assembly and configured to move the picking assembly from a first position to a second position.

17. A method comprising:

determining, by a controller in communication with a picking assembly, a first item to grasp using the picking assembly, wherein the picking assembly comprises a first suction cup assembly that has a first flow rate, and a second suction cup assembly that has a second flow rate, wherein the first flow rate and second flow rate are different flow rates, wherein the first suction cup assembly has a first suction cup of a first diameter, and the second suction cup assembly has a second suction cup of the first diameter, and wherein the second suction cup assembly is a center suction cup assembly;

determining one or more characteristics associated with the first item;

determining that the first item is to be grasped using the first suction cup assembly instead of the second suction cup assembly based at least in part on the first flow rate and the one or more characteristics; and causing the picking assembly to grasp the first item using the first suction cup assembly.

18. The method of claim 17, further comprising:

determining a second item to grasp using the picking assembly;

determining one or more characteristics associated with the second item;

determining that the second item is to be grasped using the second suction cup assembly based at least in part on the second flow rate; and causing the picking assembly to grasp the second item using the second suction cup assembly.

19. The method of claim 17, further comprising:

causing the picking assembly to offset a default picking position to align the first suction cup assembly with the first item.

20. The method of claim 17, wherein the first flow rate is at least five times greater than the second flow rate.

* * * * *